United States Patent
Luo (10) Patent No.: US 12,395,120 B2
(45) Date of Patent: Aug. 19, 2025

(54) FOLDABLE SOLAR ASSEMBLY

(71) Applicant: Tempo Manufacturing LLC, Jiangsu (CN)

(72) Inventor: Xiong Luo, Jiangsu (CN)

(73) Assignee: Tempo Manufacturing LLC, Nantong (CN)

( * ) Notice: Subject to any disclaimer, the term of this patent is extended or adjusted under 35 U.S.C. 154(b) by 106 days.

(21) Appl. No.: 18/462,732

(22) Filed: Sep. 7, 2023

(65) Prior Publication Data

US 2024/0088826 A1   Mar. 14, 2024

(30) Foreign Application Priority Data

Sep. 8, 2022 (CN) .......................... 202211092676.9

(51) Int. Cl.
*H02S 30/20* (2014.01)
*H02S 20/23* (2014.01)

(52) U.S. Cl.
CPC .............. *H02S 30/20* (2014.12); *H02S 20/23* (2014.12)

(58) Field of Classification Search
None
See application file for complete search history.

(56) References Cited

U.S. PATENT DOCUMENTS

| | | | | |
|---|---|---|---|---|
| 4,452,234 A | * | 6/1984 | Withjack | F24S 25/70 136/246 |
| 2010/0000592 A1 | * | 1/2010 | Ko | F24S 30/20 136/246 |
| 2011/0146751 A1 | * | 6/2011 | McGuire | F03D 9/007 136/245 |
| 2013/0234645 A1 | * | 9/2013 | Goei | H02S 20/32 320/101 |
| 2019/0305720 A1 | * | 10/2019 | Rogalka | H02S 30/20 |

FOREIGN PATENT DOCUMENTS

| | | | | |
|---|---|---|---|---|
| CN | 113561785 A | * | 10/2021 | |
| LU | 100312 B1 | * | 10/2017 | |
| WO | WO-2015164913 A1 | * | 11/2015 | H02S 30/20 |

OTHER PUBLICATIONS

Machine translation of CN113561785A (Year: 2021).*

* cited by examiner

*Primary Examiner* — Ryan S Cannon
(74) *Attorney, Agent, or Firm* — Wang Law Firm, Inc.

(57) ABSTRACT

A foldable solar panel assembly has an openable base assembly and three solar panels. The base assembly has a rectangular lower base and two movable upper bases which are respectively disposed at a left and right side of the lower base. The lower base and each upper base each have a corresponding recess, the plurality of solar panels has a first solar panel arranged in the recess of the lower base, and a second solar panel and a third solar panel respectively arranged in the corresponding recess of each of the two upper bases. Or, the foldable solar panel assembly has a foldable base assembly. Two solar panels are disposed on a base assembly.

3 Claims, 7 Drawing Sheets

FOLDABLE SOLAR ASSEMBLY

TECHNICAL FIELD OF THE INVENTION

The present invention relates to a field of outdoor umbrellas, and in particular to a foldable solar panel assembly applied to an umbrella or a sun canopy.

BACKGROUND OF THE INVENTION

As a kind of outdoor leisure item, umbrellas are widely applied in squares, beaches, parks, gardens or similar places to shield an individual from wind, rain and sun. In order to enable umbrellas used outdoor to light at night, umbrellas with solar lights have appeared at present. The solar light umbrellas bring comfort and convenience to outdoor activities at night by solar power lighting/decoration in places such as beaches, open-air bars and coffee houses.

However, the solar cell panels of the solar light umbrellas in the current market are small in size and low in power, and high-capacity batteries cannot be arranged inside the solar light umbrellas, so the solar light umbrellas have a very short lighting duration and cannot provide long-time lighting.

After searching, a Chinese patent CN205005009U (patent No.: CN201520697240.1) disclosed a foldable solar panel, comprising two rectangular fixed frames, two rectangular panel bodies and a plurality of connecting blocks, wherein the panel bodies are fixedly connected in the fixed frames; the connecting blocks are rectangular and have end faces and side faces located on two sides of the end faces; support columns are vertically connected to the end faces; guide slots are formed on the connecting blocks on two sides of the support columns; one end of each guide slot extends to the support column, while the other end thereof extends to the side face of the connecting block; connecting grooves are formed on two opposite walls of each guide slot in a lengthwise direction; a plurality of connecting columns are arranged on one edge of each fixed frame in the lengthwise direction, and connecting pins are vertically arranged at free ends of the connecting columns; the connecting columns are slidingly inserted into the guide slots, and the connecting pins are slidable in the connecting grooves; positioning members which fix the two panel bodies when the side faces of the two panel bodies are in the same plane or when the side faces of the two panel bodies are parallel are arranged between the connecting columns and the connecting blocks; legs are vertically arranged on the side faces of the free ends of the fixed frames; and, when the side faces of the two panel bodies are in the same plane, the ends of the legs are flush with the ends of the support columns. This solar panel is also foldable and is used in the photovoltaic systems of buildings to solve the problem of storage, but the solar panel problem of solar light umbrellas cannot be solved.

SUMMARY OF THE INVENTION

It is an object of the present invention to provide a foldable solar panel assembly which is simple and compact in structure, large in solar panel area and high in charging efficiency.

For achieving the above object, a first solution: a foldable solar panel assembly comprises an openable base assembly, a plurality of solar panels disposed on the base assembly; the base assembly comprises a rectangular lower base having a left side and a right side and two movable upper bases which are respectively disposed at the left and right side of the lower base and are capable of sliding leftward and rightward on the lower base to cover or uncover the lower base; the lower base and each upper base each have a corresponding recess for receiving one of a plurality of solar panels, the plurality of solar panels has a first solar panel arranged in the recess of the lower base, and a second solar panel and a third solar panel respectively arranged in the corresponding recess of each of the two upper bases.

Preferably, the lower base has a bottom and a top surface, a pair of wheels is mounted on bottoms of each of the two upper bases, and the lower base has two guiding grooves on the top surface and disposed horizontally on the lower base for the pair of wheels to limitedly roll along, so as to slide the two upper bases leftward and rightward relative to the lower base.

Preferably, the two upper bases are arranged symmetrically along a central line of the lower base and have the same size, each upper base has an opening adjacent to the central line communicating with the corresponding recess, after the two upper bases move adjacent to each other, the two upper bases cover the lower base wholly, and the second solar panel and the third solar panel touch each other.

Preferably, the foldable solar panel assembly further comprises one or more motors having an output shaft and a power input end, the output shaft of the motor is engaged with the wheels, the power input end of the motor is connected to the second solar panel or the third solar panel, and the motors are powered by the solar panels.

For achieving the above object, a second solution: the foldable solar panel assembly comprises a foldable base assembly, a plurality of solar panels disposed on the base assembly; the base assembly comprises a fixed base having a left side and a right side and two movable plates, the fixed base is rectangular, each movable plate is respectively hinged to the left side and right side of the fixed base through a hinge to being rotatable relative to the fixed base; the fixed base has a recess in a top surface of the fixed base for receiving one solar panel, and each movable plate has a recess in a top surface of each movable plate when unfolded for receiving one solar panel; correspondingly, the plurality of solar panels comprises a first solar panel arranged in the recess of the fixed base, and a second solar panel and a third solar panel respectively arranged in the recesses of the two movable plates.

Preferably, the two moving plates are arranged symmetrically and have the same size.

Preferably, the two moving plates after being folded have the same combined size as that of the fixed base.

Preferably, the foldable solar panel assembly further comprises one or more motors having an output shaft and a power input end, each hinge has two loose leaves, the output shaft of the motor is engaged with one of the loose leaves of each hinge, the power input end of the motor is connected to the second solar panel or the third solar panel, and the motors are powered by the solar panels.

Compared with the prior art, the present invention has the following advantages. There are three solar panels, and two of the solar panels are arranged on the upper bases (moving plates), so that the upper bases (moving plates) can be folded relative to the lower base (fixed base) in an openable manner or a fordable manner. When the umbrella is unfolded, the upper bases (moving plates) can be opened, so that an area of the solar panel is increased and a high-efficient charging is achieved. The present invention is simple, rational and compact in structure and convenient and quick to use, thereby effectively solving the problem of small area and low power of conventional solar panels, greatly improving the charging efficiency and prolonging the lighting duration.

The foldable solar panel assembly of the present invention can be mounted on a top of the umbrella and can also be mounted on a roof of the sun canopy.

DETAILED DESCRIPTION OF THE INVENTION

The present invention will be further described below in detail by embodiments with reference to the accompanying drawings.

Embodiment 1

Figure 1:
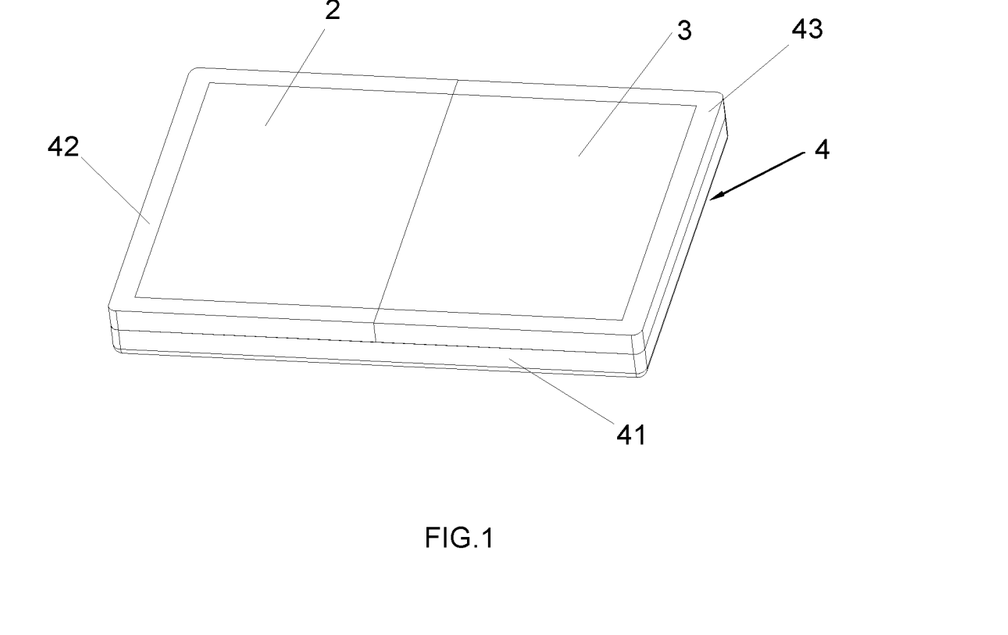
FIG. 1 is a perspective view of a foldable solar panel assembly according to Embodiment 1 of the present invention (when a rotor is omitted)
Figure 2:
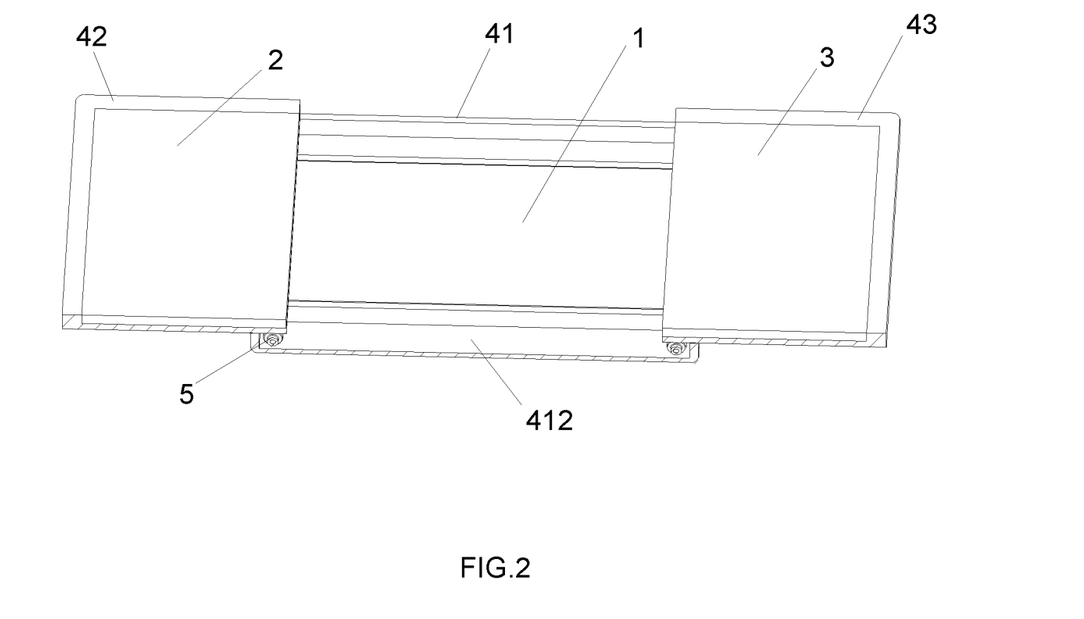
FIG. 2 is a perspective view of part of the foldable solar panel assembly when upper bases are open according to Embodiment 1 of the present invention (when the rotor is omitted)
Figure 3:
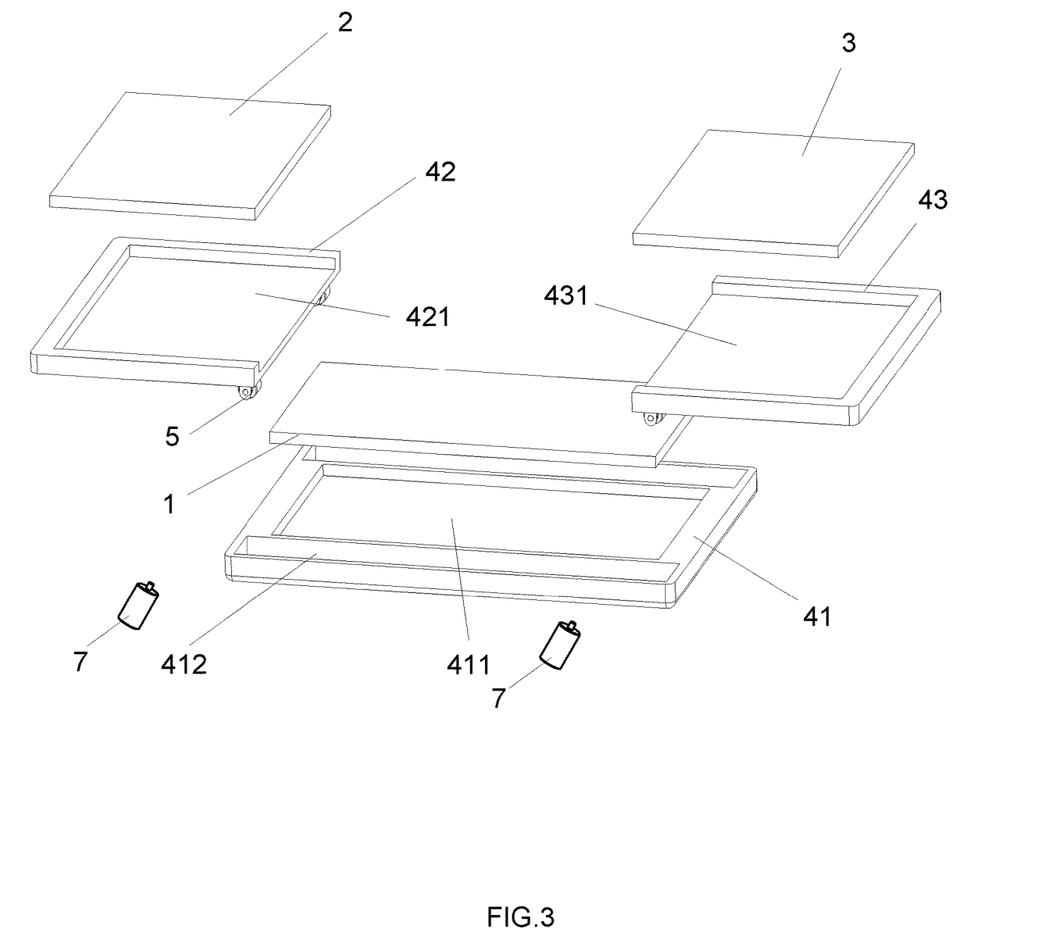
FIG. 3 is an exploded view of the foldable solar panel assembly according to Embodiment 1 of the present invention.

FIGS. 1-3 show a preferred Embodiment 1 of the foldable solar panel assembly of the present invention. The foldable solar panel assembly A comprises an openable base assembly 4 and a plurality of solar panels 1, 2, 3 arranged on the base assembly 4. The base assembly 4 comprises a rectangular lower base 41 having a left side and a right side and two movable upper bases 42, 43 which are respectively disposed at the left and right side of the lower base 41 and are capable of sliding leftward and rightward on the lower base 41 to cover or uncover the lower base 41. The two upper bases 42, 43 have the same combined size as that of the lower base 41. The lower base 41 and each upper base 42, 43 each have a corresponding recess 411, 421, 431 for receiving one of a plurality of solar panels 1, 2, 3, the plurality of solar panels 1, 2, 3 has a first solar panel 1 arranged in the recess 411 of the lower base 41, and a second solar panel 2 and a third solar panel 3 respectively arranged in the corresponding recess 421, 431 of each of the two upper bases 42, 43. The lower base 41 has a bottom and a top surface, a pair of wheels 5 is mounted on bottoms of each of the two upper bases 42, 43, and the lower base 41 has two guiding grooves 412 on the top surface and disposed horizontally on the lower base 41 for the pair of wheels 5 to limitedly roll along, so as to slide the two upper bases 42, 43 leftward and rightward relative to the lower base 41. The guiding grooves 412 generally have an inverted T-shaped section, so it is convenient for the wheels 5 to slide in the guiding grooves 412 without falling off. For the convenience of machining and mounting, the two upper bases 42, 43 are arranged symmetrically along a central line of the lower base 41 and have the same size. The recess 421 of the upper base 42 and the recess 431 of the upper base 43 have the same size, and the second solar panel 2 and the third solar panel 3 have the same size. Each upper base 42, 43 has an opening adjacent to the central line communicating with the corresponding recess 421, 431, after the two upper bases 42, 43 move adjacent to each other, the two upper bases 42, 43 cover the lower base 41 wholly, and the second solar panel 2 and the third solar panel 3 touch each other.

The opening mode of the upper bases 42 and 43 is not limited to the manual wheels 5, and the upper bases 42 and 43 may be driven by a motor 7. In addition, the output shaft of the motor is engaged with the wheels 5, the motor 7 can be arranged in mounting chambers of the respective upper bases 42 and 43. As shown in FIG. 3, the power input end of the motor 7 is connected to the second solar panel 2 or the third solar panel 3. When the second solar panel 2 and the third solar panel 3 are powered on by the sun, the solar panels A can be automatically folded or unfolded driven by the driving of the motor 7.

Figure 7:
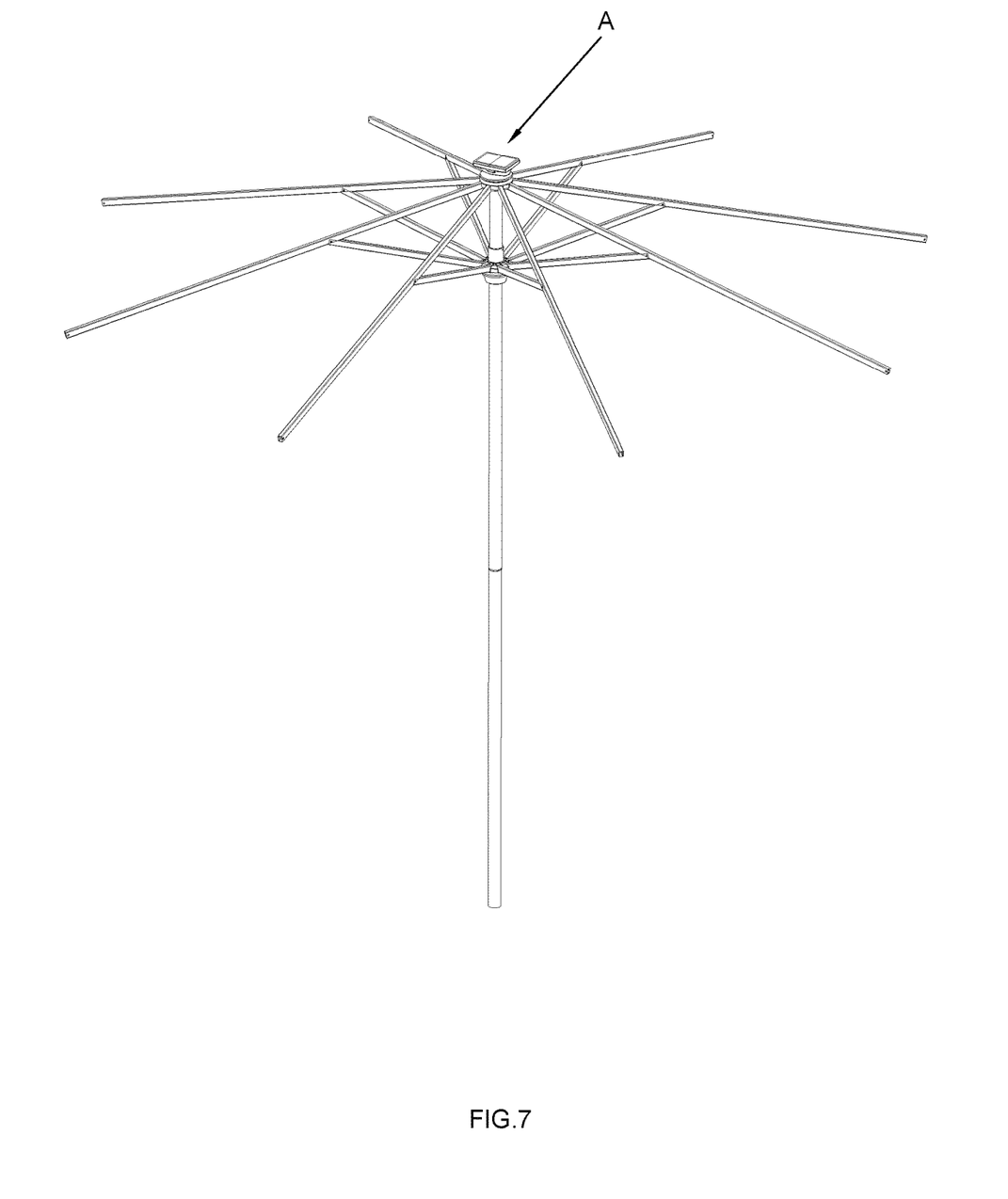
FIG. 7 is a perspective view of the foldable solar panel assembly applied on a center-support umbrella according to Embodiment 1 of the present invention.
Figure 8:
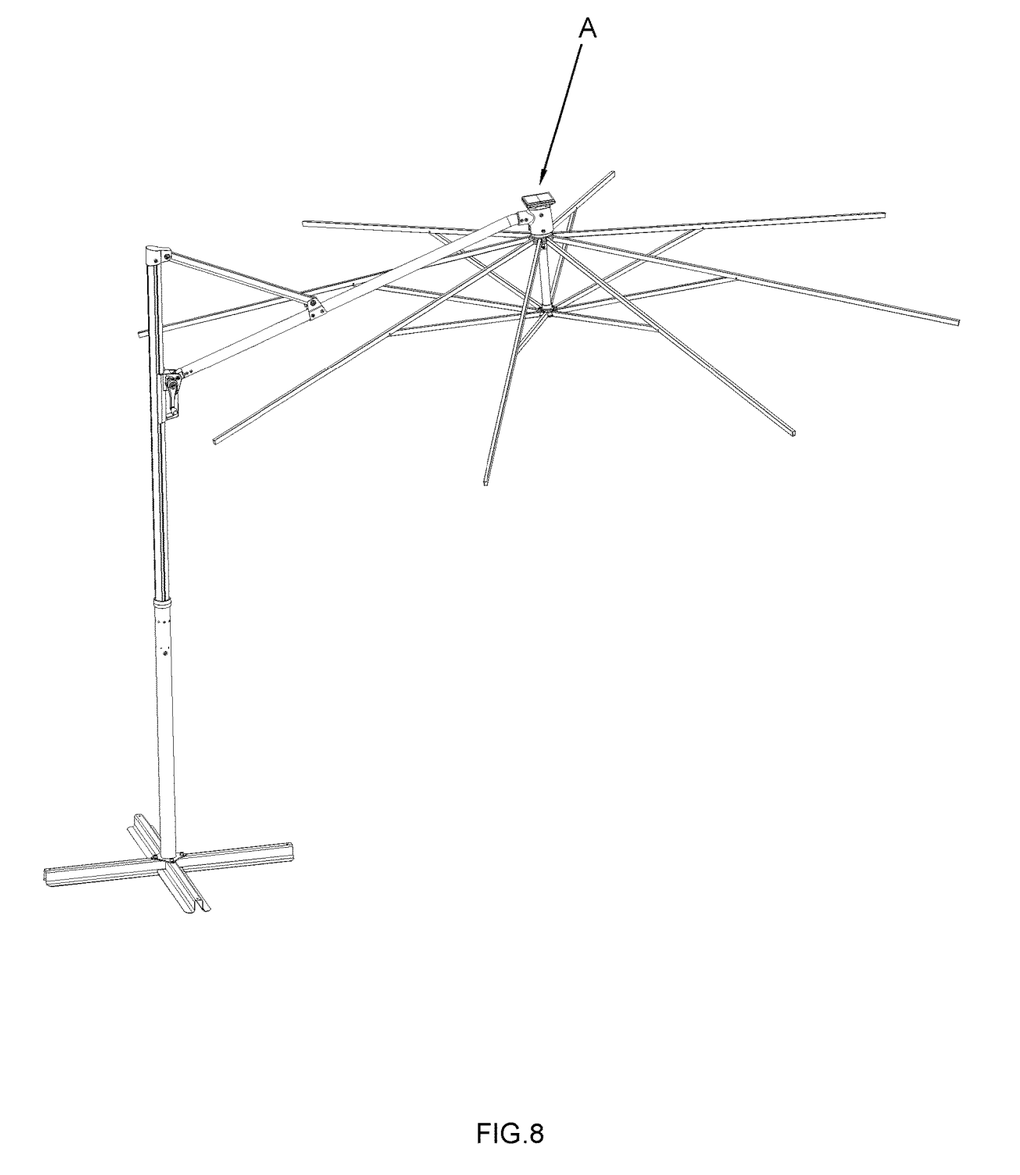
FIG. 8 is a perspective view of the foldable solar panel assembly applied on a side-support umbrella according to Embodiment 1 of the present invention.
Figure 9:
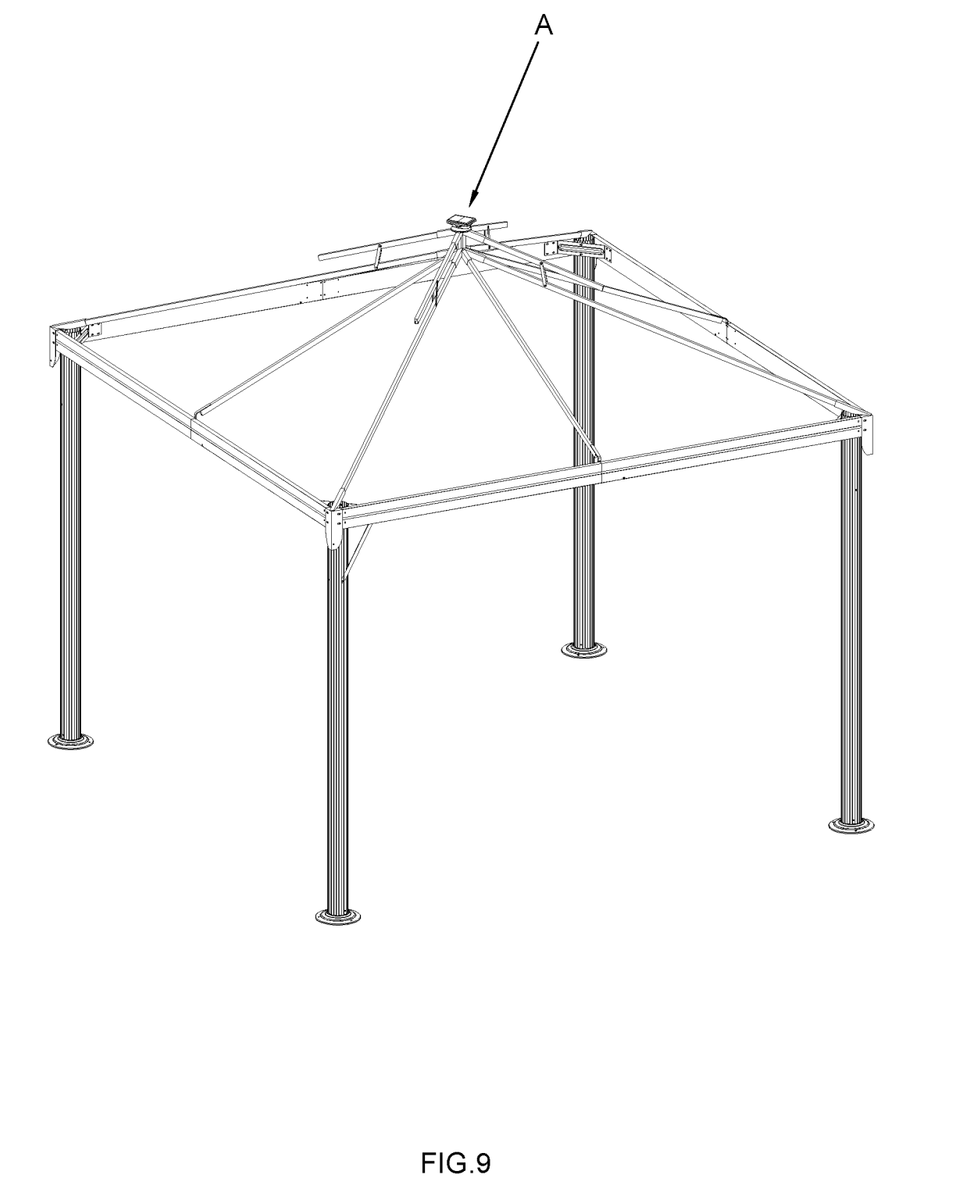
FIG. 9 is a perspective view of the foldable solar panel assembly applied on a roof of a sun canopy according to Embodiment 1 of the present invention.

When in use, the foldable solar panel assembly A in this embodiment may be mounted on the top of a center-support umbrella or a side-support umbrella or the roof of a sun canopy which is easy to receive sunlight, as shown in FIGS. 7-9. When a user opens the umbrella, the user may manually open the upper bases 42 and 43 for use; or, after the umbrella is opened, the upper bases 42 and 43 are opened automatically driven by the motor. Thus, the area of the solar panels is greatly increased, high-efficient charging is realized, and the demand for long-time lighting is satisfied.

Embodiment 2

Figure 4:
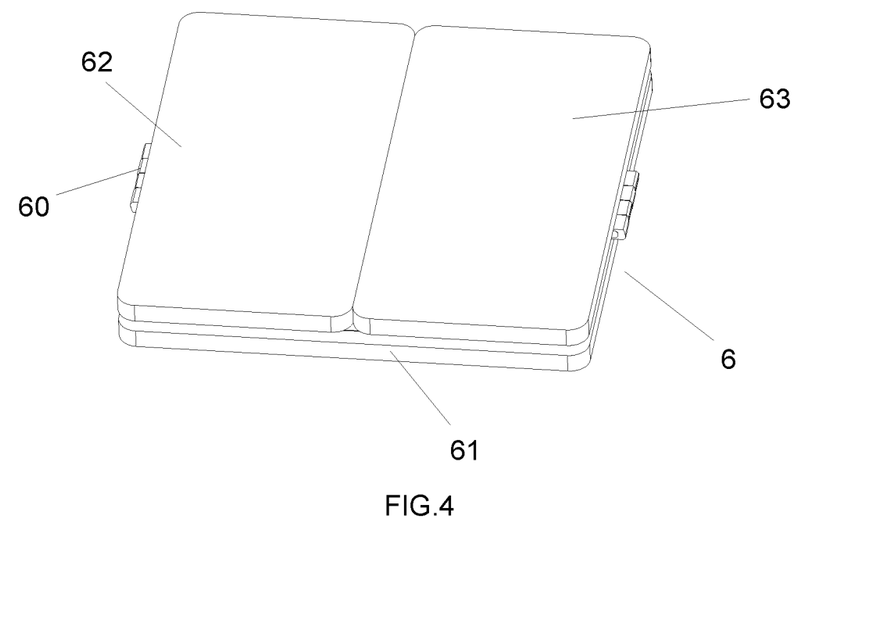
FIG. 4 is a perspective view of a foldable solar panel assembly according to Embodiment 2 of the present invention (when a rotor is omitted)
Figure 5:
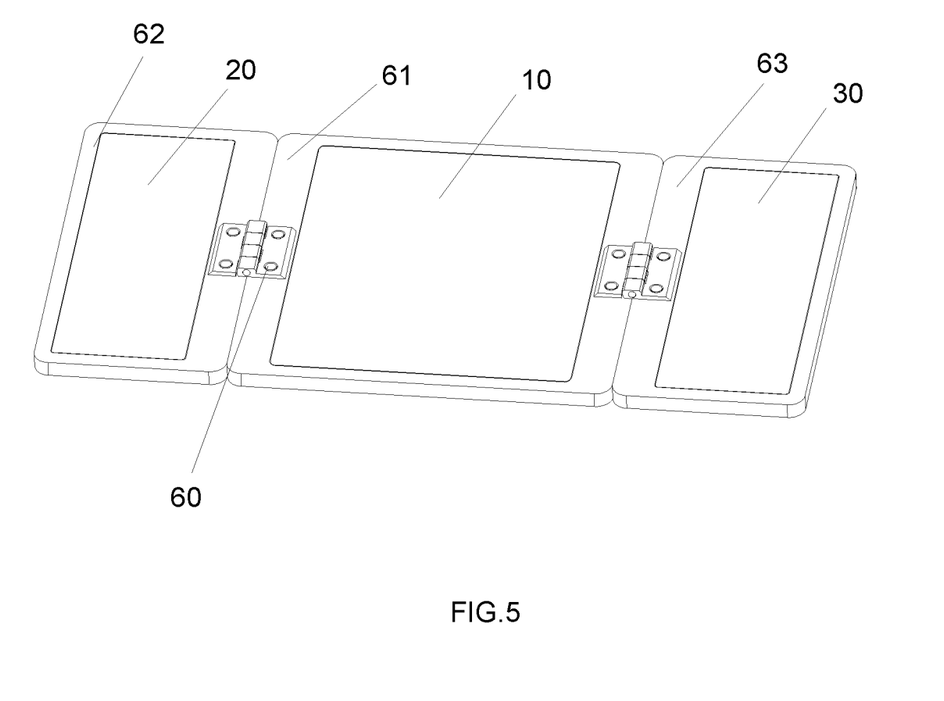
FIG. 5 is a perspective view of the foldable solar panel assembly when moving plates are open according to Embodiment 2 of the present invention (when the rotor is omitted)
Figure 6:
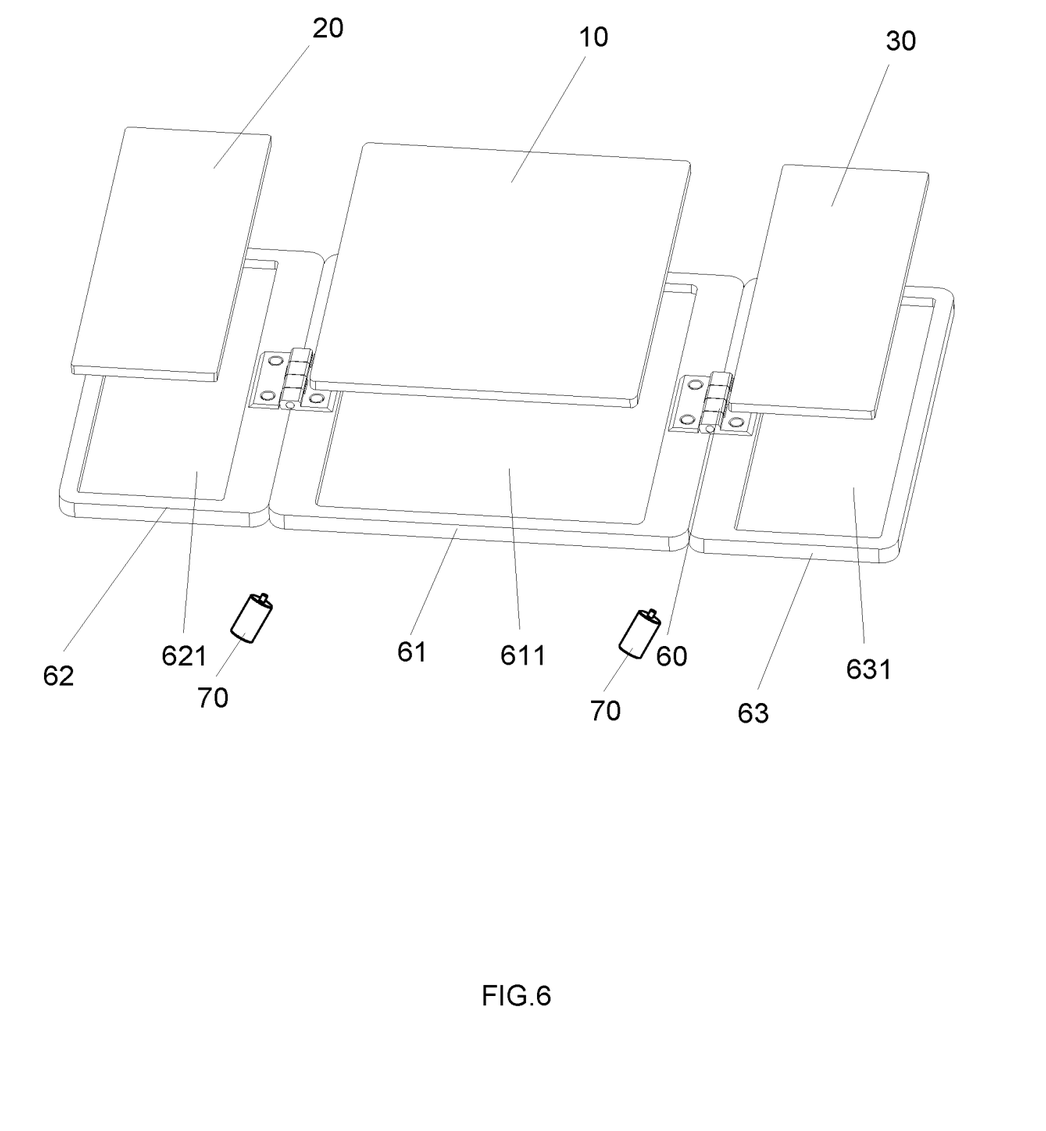
FIG. 6 is an exploded view of FIG. 5.

FIGS. 4-6 show a preferred Embodiment 2 of the foldable solar panel assembly of the present invention. The foldable solar panel assembly comprises a foldable base assembly 6, a plurality of solar panels 10, 20, 30 disposed on the base assembly 6. The base assembly 6 comprises a fixed base 61 having a left side and a right side and two movable plates 62, 63, the fixed base 61 is rectangular, each movable plate 62, 63 is respectively hinged to the left side and right side of the fixed base 61 through a hinge 60 to being rotatable relative to the fixed base 61. The fixed base 61 has a recess 611 in a top surface of the fixed base 61 for receiving one solar panel, and each movable plate 62, 63 has a recess in a top surface of each movable plate 62, 63 when unfolded for receiving one solar panel; correspondingly, the plurality of solar panels 10, 20, 30 comprises a first solar panel 10 arranged in the recess 611 of the fixed base 61, and a second solar panel 20 and a third solar panel 30 respectively arranged in the recesses 621, 631 of the two movable plates 62, 63. For the convenience of machining and mounting, the two moving plates 62, 63 are arranged symmetrically and have the same size, and the two movable plates 62, 63 after being folded have the same combined size as that of the fixed base 61. The recess 621 of the movable plate 62 and the recess 631 of the movable plate 63 have the same size, and the second solar panel 20 and the third solar panel 30 have the same size.

The two moving plates 62 and 63 can be opened manually. In this embodiment, one or more motors 70 have an output shaft and a power input end, each hinge 60 has two loose leaves, the output shaft of the motor 70 is engaged with one of the loose leaves of each hinge 60. The motor 70 can be arranged in each mounting chamber of the fixed base 61. The output shaft of the motor 70 is engaged with pivots of the hinge 60. Each pivot fixes each hinge 60, each hinge 60 connects to a moving plate 62 or 63. The power input end of the motor 70 is connected to the second solar panel 20 or the third solar panel 30, and the motors 70 are powered by the solar panels 20, 30. In this way, the moving plates 62, 63 are folded or unfolded by the driving of the motor 70.

The mounting and usage manners are the same as those in Embodiment 1.

The protection scope of the present invention is not limited to each embodiment described in this description. Any changes and replacements made on the basis of the scope of the present invention patent and of the description shall be included in the scope of the present invention patent.

The invention claimed is:

1. A foldable solar panel assembly, comprising:
an openable base assembly;
a plurality of solar panels disposed on the base assembly;
wherein,
the base assembly comprises a rectangular lower base having a left side and a right side and two movable upper bases which are respectively disposed at the left and right side of the lower base and are capable of sliding leftward and rightward on the lower base to cover or uncover the lower base;
the lower base and each upper base each have a corresponding recess for receiving one of a plurality of solar panels, the plurality of solar panels has a first solar panel arranged in the recess of the lower base, and a second solar panel and a third solar panel respectively arranged in the corresponding recess of each of the two upper bases; and
the two upper bases are arranged symmetrically along a central line of the lower base and have the same size, each upper base has an opening adjacent to the central line communicating with the corresponding recess, after the two upper bases move adjacent to each other, the two upper bases cover the lower base wholly, and the second solar panel and the third solar panel touch each other.

2. The foldable solar panel assembly of claim 1, wherein the lower base has a bottom and a top surface, a pair of wheels is mounted on bottoms of each of the two upper bases, and the lower base has two guiding grooves on the top surface and disposed horizontally on the lower base for the pair of wheels to limitedly roll along, so as to slide the two upper bases leftward and rightward relative to the lower base.

3. The foldable solar panel assembly of claim 2, further comprising one or more motors having an output shaft and a power input end, the output shaft of the motor is engaged with the wheels, the power input end of the motor is connected to the second solar panel or the third solar panel, and the motors are powered by the solar panels.

* * * * *